(12) United States Patent
Kinloch et al.

(10) Patent No.: US 7,214,722 B2
(45) Date of Patent: May 8, 2007

(54) PROCESS FOR RECYCLING DETERGENT POUCHES

(75) Inventors: James Iain Kinloch, Cramlington (GB); David John Smith, Hett (GB); Jose Luis Vega, Strombeek-Bever (BE)

(73) Assignee: The Procter & Gamble Company, Cincinnati, OH (US)

( * ) Notice: Subject to any disclaimer, the term of this patent is extended or adjusted under 35 U.S.C. 154(b) by 536 days.

(21) Appl. No.: 10/805,035

(22) Filed: Mar. 19, 2004

(65) Prior Publication Data

US 2004/0192793 A1    Sep. 30, 2004

(30) Foreign Application Priority Data

Mar. 24, 2003    (EP)    ................................ 03251842

(51) Int. Cl.
*C11D 17/04*    (2006.01)

(52) U.S. Cl. ....................................................... 521/40
(58) Field of Classification Search .................. 521/40
See application file for complete search history.

(56) References Cited

U.S. PATENT DOCUMENTS

2002/0137648 A1*    9/2002    Sharma et al. ............... 510/218
2002/0142930 A1*   10/2002    Smith et al. ................. 510/218
2002/0142931 A1*   10/2002    DeNome et al. ............. 510/220
2002/0169092 A1*   11/2002    Alexandre et al. ........... 510/220

* cited by examiner

*Primary Examiner*—Katarzyna Wyrozebski
(74) *Attorney, Agent, or Firm*—Kevin L. Waugh; Laura R. Grunzinger

(57) ABSTRACT

Process for treating or recycling a waste single or multi-compartment detergent pouch containing one or more detergent or detergent auxiliary compositions enclosed within a water-soluble enveloping material.

11 Claims, No Drawings

PROCESS FOR RECYCLING DETERGENT POUCHES

CROSS REFERENCE TO RELATED APPLICATIONS

This application claims the benefit of the filing day of EPO Application No. 03251842.5, filed on Mar. 24, 2003, the disclosure of which is incorporated by reference.

TECHNICAL FIELD

The present invention is in the field of detergent pouches, in particular it relates to a process for treating or recycling said pouches and use of the material obtained therefrom.

BACKGROUND OF THE INVENTION

Detergent compositions in pouch form have become increasingly popular among consumers. In the production process of such pouches, it may occur that a proportion of them do not comply with the required manufacture specifications and are therefore not suitable for sale. This is especially the case for pouches produced during the start up and shut down of the process, i.e., before the process reaches a steady state operation.

There is a need for dealing with these "non-suitable" pouches (herein also referred as "waste" or "rejects") for economic and environmental reasons. The nature of the pouches makes this a complex issue. Usually pouches are constituted of an enveloping material and a detergent composition, having very different chemical and physical properties from one another. This complexity is increased when the pouches have more than one compartment, especially if the compartments contain different compositions.

SUMMARY OF THE INVENTION

One of the objectives of the present invention is to provide a process for treating or recycling waste detergent pouches, producing no or a minimum amount of residue.

Another objective is to produce recycled material suitable for reuse in a detergent pouch without adversely affecting the performance of the pouch.

Thus according to a first aspect of the invention there is provided a process for treating or recycling a waste single or multi-compartment detergent pouch containing one or more detergent or detergent auxiliary compositions enclosed within a water-soluble enveloping material, the process comprising:
  i) introducing the waste pouch into a mixing chamber;
  ii) adding a solvent or other solubilizing agent thereto in an amount sufficient to at least partially dissolve the enveloping material and subjecting the mixture to mechanical mixing to form a slurry; and
  iii) converting the resulting slurry to a solid or semi-solid form.

Preferably, the mixture of step ii) contains an amount of solubilizing agent and is mechanically mixed for a time sufficient to completely dissolve the enveloping material.

By "waste" pouch is herein meant any pouch not considered suitable for sale, either because it does not meet required manufacturing specifications or because the formulation or pouch appearance are not up to the standards required for sale. Waste pouch also includes a pouch that while possibly suitable for sale is to be disposed of for other reasons.

The term "slurry" as used herein refers generally to the mixture of waste pouch and solubilizing agent resulting from partial or complete dissolution of the enveloping material and includes mixes in the form of solid dispersions or suspensions, liquid-liquid emulsions, solutions and mixtures thereof with undissolved pouch residue.

In a preferred embodiment the pouch is a multi-compartment pouch comprising at least two compartments containing compositions physically or chemically different from one another. In a preferred embodiment of this type the multi-compartment pouch comprises a first compartment containing a solid composition such as a powder or tablet and a second compartment containing a liquid composition which term includes compositions in semi-liquid, gel or paste-like form.

The process of the invention is especially suitable in the case of multi-compartment pouches because the pouch is treated as a whole avoiding the need of additional steps for the separation of different compartments. Thus the process can bring savings in capital costs and reduction of the operational costs. In a preferred embodiment the treating or recycling process of the invention is performed in a combined mixer-dryer apparatus.

An advantage of the multi-compartment form is the ability to incorporate incompatible ingredients in the different pouch compartments but this incompatibility can lead to processing problems or undesirable reactions during waste treatment. For example, when pouches containing bleach and amines in different compartments are treated, the bleach can react with the amine generating very unpleasant odour. Moreover the odour problem persists when the recycled material is subsequently incorporated in a bleach-containing detergent composition. In order to overcome this the pouch/solvent mixture is preferably treated with an oxidising agent such as hydrogen peroxide. Additionally, the addition of oxidising agent discolours the mixture improving the appearance of the resulting product. Thus, in a preferred embodiment of the invention the treating or recycling process of pouches containing a solid composition comprising a detergency bleach and a liquid composition comprising an amine, comprises the further step of adding a peroxide to the pouch/solvent mixture in order to essentially completely oxidise the amino-group of the amine. Thus the resulting product of this process will be suitable for inclusion in detergent powder composition comprising bleach. Alternatively, an aldehyde can be added to the pouch/solvent mixture instead of the oxidising agent. The aldehyde will complex the amino-group of the amine. This will stop undesirable reactions of the amine. A preferred aldehyde for use herein is citronella.

Although the present invention is primarily directed to the treatment or recycling of whole multi-compartment pouches, in some cases it is preferred to separately treat or recycle the different compartments of the pouch. This is particularly feasible if the different pouch compartments have different dissolution times, for example in the case of pouches whose compartments are made of different enveloping materials (for example materials of different thickness or materials of different chemical composition). Thus, another aspect of the invention provides a process for treating or recycling a waste multi-compartment detergent pouch containing one or more detergent or detergent auxiliary compositions enclosed within a water-soluble enveloping material wherein a first compartment contains a solid composition and a second compartment contains a liquid composition and wherein the first compartment has a dissolution time lower than the second, the process comprising:

i) introducing a waste pouch into a mixing chamber;

ii) adding a solvent or other solubilizing agent thereto in an amount sufficient to completely or partially dissolve the enveloping material of the first compartment and optionally subjecting the mixture to mechanical mixing to form a slurry wherein the residence time of pouch in the mixing chamber is greater than the dissolution time of the first compartment and smaller than that of the second compartment;

iii) separating the undissolved pouch residue; and iv) converting the resulting slurry to a solid or semi-solid form.

This process aspect is preferred for solid/liquid dual compartment pouches, especially for vacuum formed pouches. In these pouches the enveloping material of the solid compartment is typically more stretched than that of the liquid compartment. Additionally, the enveloping material of the solid compartment is sometimes pin-pricked, to facilitate the vacuum forming process, therefore, this compartment will tend to dissolve faster than the liquid compartment even if the compartments are made of the same enveloping material. The recycled material produced by this process can be added to powder compositions for making new pouches, without adversely affecting the granulometry or the detergency performance of the composition.

According to another aspect of the invention there is provided a process for making a single or multi-compartment detergent pouch wherein one or more compartments thereof contains a detergent or detergent auxiliary composition enclosed within a water-soluble enveloping material, said process comprising the steps of:

i) forming one or more open compartments;

ii) filling or partially filling at least one open compartment with a detergent or detergent auxiliary composition comprising the recycled material; and iii) closing and sealing the open compartments to produce a single or multi-compartment pouch.

This process permits the use of essentially all the material of rejected pouches, eliminating the production of waste whilst maintaining overall detergent performance, thereby providing both economic and environmental benefits.

DETAILED DESCRIPTION OF THE INVENTION

The present invention envisages a process for treating or recycling a waste single or multi-compartment detergent pouch.

The enveloping material is considered to be water-soluble if it has a water-solubility of at least 50%, preferably at least 75% or even at least 95%, as measured by the method set out here after using a glass-filter with a maximum pore size of 20 microns.

50 grams±0.1 gram of enveloping material is added in a pre-weighed 400 ml beaker and 245 ml±1 ml of distilled water is added. This is stirred vigorously on a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the % solubility or dispersability can be calculated.

Preferred enveloping materials are polymeric materials, preferably polymers which are formed into a film or sheet. The enveloping material can, for example, be obtained by casting, blow-moulding, extrusion or blown extrusion of the polymeric material, as known in the art.

Most preferred enveloping materials are PVA films known under the trade reference Monosol M8630, as sold by Chris-Craft Industrial Products of Gary, Ind., US, and PVA films of corresponding solubility and deformability characteristics. Other films suitable for use herein include films known under the trade reference PT film or the K-series of films supplied by Aicello, or VF-HP film supplied by Kuraray.

The detergent compositions herein can comprise one or more detergent active or auxiliary components. Detergent actives may be selected from traditional detergent ingredients such as builders, chelants, bleaching agents, surfactants, alkalinity sources, and enzymes. Detergent auxiliaries may be selected from finishing agents and care agents. Ingredients suitable for use herein are described herein below. Most of these ingredients can be used in both solid and liquid compositions.

Surfactant

Surfactants suitable for use here in are preferably low foaming by themselves or in combination with other components (i.e. suds suppressers). Surfactants suitable herein include anionic surfactants such as alkyl sulfates, alkyl ether sulfates, alkyl benzene sulfonates, alkyl glyceryl sulfonates, alkyl and alkenyl sulphonates, alkyl ethoxy carboxylates, N-acyl sarcosinates, N-acyl taurates and alkyl succinates and sulfosuccinates, wherein the alkyl, alkenyl or acyl moiety is $C_5$–$C_{20}$, preferably $C_{10}$–$C_{18}$ linear or branched; cationic surfactants such as chlorine esters and mono $C_6$–$C_{16}$ N-alkyl or alkenyl ammonium surfactants wherein the remaining N positions are substituted by methyl, hydroxyethyl or hydroxypropyl groups; low and high cloud point nonionic surfactants and mixtures thereof including nonionic alkoxylated surfactants (especially ethoxylates derived from $C_6$–$C_{18}$ primary alcohols), ethoxylated-propoxylated alcohols (e.g., BASF Poly-Tergent® SLF18), epoxy-capped poly(oxyalkylated) alcohols (e.g., BASF Poly-Tergent® SLF18B—see WO-A-94/22800), ether-capped poly(oxyalkylated) alcohol surfactants, and block polyoxyethylene-polyoxypropylene polymeric compounds such as PLURONIC®, REVERSED PLURONIC®, and TETRONIC® by the BASF-Wyandotte Corp., Wyandotte, Mich.; amphoteric surfactants such as alkyl amphocarboxylic surfactants such as Miranol™ C2M; and zwitterionic surfactants such as the betaines and sultaines; and mixtures thereof. Surfactants are typically present at a level of from about 0.2% to about 30% by weight, more preferably from about 0.5% to about 10% by weight, most preferably from about 1% to about 5% by weight of composition. Preferred surfactants for use herein are low foaming and include low cloud point nonionic surfactants and mixtures of higher foaming surfactants with low cloud point nonionic surfactants which act as suds suppresser therefor.

A preferred surfactant for use herein is an amine oxide having the formula:

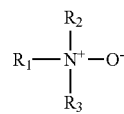

where $R_1$ is selected from an alkyl, hydroxyalkyl, acylamidopropyl and alkyl phenyl groups containing an average of at least 12 carbon atoms in the alkyl moiety; and $R_2$ and $R_3$ are independently selected from $C_{1-3}$ alkyl and/or $C_{2-3}$ hydroxyalkyl groups and polyethylene oxide groups containing from 1 to 3, preferably 1, ethylene oxide units. Preferred amine oxides are those wherein the $R_1$ alkyl moiety of the amine oxide contains an average of from 13 to 17 carbon atoms.

Preferred amine oxides from the view point of grease removal and filming and spotting reduction as well as for their environmental profile are tetradecyl dimethyl amine oxide, hexadecyl dimethyl amine oxide and mixtures thereof.

Builder

Builders suitable for use herein include builder which forms water-soluble hardness ion complexes (sequestering builder) such as citrates and polyphosphates e.g. sodium tripolyphosphate and sodium tripolyphosphate hexahydrate, potassium tripolyphosphate and mixed sodium and potassium tripolyphosphate salts and builder which forms hardness precipitates (precipitating builder) such as carbonates e.g. sodium carbonate. The builder is typically present at a level of from about 30 to about 80%, preferably from about 40 to about 70% by weight of composition.

Silicates

Silicates suitable for use herein include partially water-soluble or insoluble builders such as crystalline layered silicates and aluminosilicates inclusive of Zeolites A, B, P, X, HS and MAP.

Amorphous sodium silicates having an $SiO_2:Na_2O$ ratio of from 1.8 to 3.0, preferably from 1.8 to 2.4, most preferably 2.0 can also be used herein although highly preferred from the viewpoint of long term storage stability are compositions containing less than about 22%, preferably less than about 15% total (amorphous and crystalline) silicate.

Enzyme

Preferred enzymes for use herein include proteolitic enzymes such as Esperase$^R$, Alcalase$^R$, Durazym$^R$ and Savinase$^R$ (Novo) and Maxatase$^R$, Maxacal$^R$, Properase$^R$ and Maxapem$^R$ (Gist-Brocades). Other enzymes suitable for use herein include bacterial and fungal cellulases such as Carezyme and Celluzyme (Novo Nordisk A/S); peroxidases; lipases such as Amano-P (Amano Pharmaceutical Co.), M1 Lipase$^R$ and Lipomax$^R$ (Gist-Brocades) and Lipolase$^R$ and Lipolase Ultra$^R$ (Novo); cutinases; α and β amylases such as Purafect Ox Am$^R$ (Genencor) and Termamyl$^R$, Ban$^R$, Fungamyl$^R$, Duramyl$^R$, and Natalase$^R$ (Novo); pectinases; and mixtures thereof. Enzymes are preferably added herein as prills, granulates, or cogranulates at levels typically in the range from about 0.0001% to about 4% pure enzyme by weight of composition.

Bleaching Agent

Bleaching agents suitable for use herein include chlorine and oxygen bleaches, especially inorganic perhydrate salts such as sodium perborate mono-and tetrahydrates and sodium percarbonate optionally coated to provide controlled rate of release, preformed organic peroxyacids and mixtures thereof with organic peroxyacid bleach precursors and/or transition metal-containing bleach catalysts (especially manganese or cobalt). Inorganic perhydrate salts are typically incorporated at levels in the range from about 1% to about 40% by weight, preferably from about 2% to about 30% by weight and more preferably from abut 5% to about 25% by weight of composition. Bleaching agents are preferably incorporated into detergent compositions in solid form.

The process according to the first aspect of this invention, i.e., process for treating or recycling a waste pouch as a whole, is generally initiated by introducing the waste pouch or plurality of pouches into a mixing chamber and adding solvent or solubilizing agent. The solvent can be added prior, simultaneous or after the introduction of the pouch or pouches into the chamber. Preferably the mixing chamber is firstly partially filled with the solvent and then the pouch or pouches is/are introduced. The amount of solvent required is such as to partially, preferably totally, dissolve the enveloping material. The enveloping material should be dissolved to an extent sufficient to permit at least 70%, preferably at least 80% by weight of the detergent composition to be released from the pouch interior into the solvent. The pouch and solvent are generally in a weight ratio of from about 2:1 to about 1:6, preferably from about 1:2 to about 1:4.

The mixing chamber is generally provided with stirring means, these means can help the homogeneization of the mixture and contribute to the rupture of the pouch. Preferred stirring means for use herein are rotating paddles, particularly suitable are paddles provided with cutting edges. The mixing chamber can be provided with a single or a plurality of stirring means, acting in a co- or contra-rotating manner.

Any solvent or other solubilizing agent capable of dissolving the enveloping material can be used. A preferred solubilizing agent, for its availability and economic profile, is water, though other solvents such as methanol, ethanol, monoethanol amine, diethanol amine, isopropanol and glycols can be used instead of or in conjunction with water.

The mixing is preferably carried out at a temperature of from about 5 to about 200° C., preferably from about 60 to about 110° C.

Once the enveloping material has been partially or preferably completely dissolved and the detergent composition has been released into the solvent, the solvent is removed partially or completely from the resulting mixture. The solvent can be removed by any known means such as filtration, drying, evaporation, extraction, etc. In the case of a pouch initially containing a solid composition, the solvent can be separated from the mixture by a single or a combination of steps for example filtration followed by air drying. The resulting product is in solid or semi-solid form.

An optional separation step, for example sieving or centrifugation, can be carried out before the separation of the solvent in order to remove undissolved pouch material. Alternatively, large particles can be separated from the resulting solid composition after the drying step by any suitable means such as sieving.

Optionally, the solid or semi-solid material can be ground, using for example a balls, bars or hammer mill in order to obtain a powder.

Oxidising agents, especially peroxide, can be added to the solvent or solubilizing agent in order to oxidise the amine and thus overcome the problem associated with the interaction between amine and other components of the composition. Alternatively the problem can be solved by adding an aldehyde.

The different unit operations of the process can be carried out in separate pieces of equipment or in a single piece of equipment. Suitable for use herein is the apparatus described in U.S. Pat. No. 4,791,735 and supplied by Forberg International AS.

The material obtained from the treatment or recycling process of the invention can be used to make new pouches. Suitable processes for making pouches include those described in the art. For example, thermo forming processes, such as those described in WO 02/16207, WO 02/16205 and WO 02/16222; vacuum forming processes such as those described in WO 02/60757, WO 02/60758 and WO 02/42408; and vacuum assisted thermo forming processes such as those described in WO 00/55045, WO 00/5506 and WO 00/55415.

EXAMPLES

Abbreviations Used in Examples

In the examples, the abbreviated component identifications have the following meanings:

| | |
|---|---|
| Carbonate | Anhydrous sodium carbonate |
| STPP | Sodium tripolyphosphate |
| Silicate | Amorphous Sodium Silicate ($SiO_2$:$Na_2O$ = from 2:1 to 4:1) |
| HEDP | Ethane 1-hydroxy-1,1-diphosphonic acid |
| Perborate | Sodium perborate monohydrate |
| Percarbonate | Sodium percarbonate of the nominal formula $2Na_2CO_3.3H_2O_2$ |
| Termamyl | α-amylase available from Novo Nordisk A/S |
| Savinase | protease available from Novo Nordisk A/S |
| FN3 | protease available from Genencor |
| SLF18 | Poly-Tergent ® available from BASF |
| $C_{14}AO$ | tetradecyl dimethyl amine oxide |
| Duramyl | α-amylase available from Novo Nordisk A/S |
| DPM | dipropylene glycol methyl ether |
| DPG | dipropylene glycol |
| Methocel | cellulosic thickener available from Dow Chemical |

In the following examples all levels are quoted as per cent (%) by weight.

EXAMPLES

Pouch Making Process

The composition of Table 1 is introduced in a two compartment layered PVA rectangular base pouch. The dual compartment pouch is made from a Monosol M8630 film as supplied by Chris-Craft Industrial Products. 17.2 g of the particulate composition and 4 g of the liquid composition are placed in the two different compartments of the pouch. The pouch dimensions under 2 Kg load are: length 3.7 cm, width 3.4 cm and height 1.5 cm. The longitudinal/transverse aspect ratio is thus 1.5:3.2 or 1:2.47. The pouch is manufactured using a two-endless surface process, both surfaces moving in continuous horizontal rectilinear motion. According to this process a first web of pouches is prepared by forming and filling a first moving web of open pouches mounted on the first endless surface and closing the first web of open pouches with the second web of filled and sealed pouches moving in synchronism therewith.

TABLE 1

| | 1 |
|---|---|
| Particulate composition | |
| $C_{14}AO$ | 5 |
| SLF18 | 5 |
| STPP | 55 |
| HEDP | 1 |
| Termamyl | 1.5 |
| FN3 | 2 |
| Percarbonate | 15 |
| Carbonate | 9 |
| Silicate | 6 |
| Perfume | 0.5 |

TABLE 1-continued

| | 1 |
|---|---|
| Liquid composition | |
| DPG | 98.5 |
| FN3 Liquid | 0.5 |
| Duramyl Liquid | 0.5 |
| Dye | 0.5 |

Example 1

30,000 of the pouches described above and 1,800 L of distilled water at 70° C. are introduced in a Dryer Forberg (model FT 5000), the mixture is converted into a slurry, the slurry is then dried and granulated followed by separation with a 850 μm vibrating sieve. The powder which does not pass through the sieve is then ground in a Hammer Mill and reblended with the previously separated fraction. The resulting powder is then reblended with the pouch composition of Table 1 at a level the resulting composition used to manufacture multi-compartment pouches according to the above described manufacturing process.

What is claimed is:

1. A process for recycling a waste multi-compartment detergent pouch containing more than one detergent or detergent auxiliary compositions enclosed within a water-soluble enveloping material, the process comprising:
   i) introducing the waste pouch into a mixing chamber;
   ii) adding a solubilizing agent thereto in an amount sufficient to at least partially dissolve the enveloping material and subjecting the mixture to mechanical mixing to form a slurry; and
   iii) converting the resulting slurry to a solid form.

2. A process according to claim 1 wherein the multi-compartment pouch comprises at least two compartments containing compositions physically different from one another.

3. A process according to claim 1 wherein the process is performed in a combined mixer-dryer apparatus.

4. A process according to claim 1 wherein the multi-compartment pouch comprises a first compartment containing a solid composition and a second compartment containing a liquid composition, and wherein the solid composition comprises a detergency bleach and the liquid composition comprises an amine, said process comprising the further step of adding a peroxide to the mixture or slurry of step ii) in order to essentially oxidise the amino-group of the amine.

5. A process according to claim 1 wherein the mixture of step ii) contains an amount of solubilizing agent and is mechanically mixed for a time sufficient to completely dissolve the enveloping material.

6. A process according to claim 1 including the step of separating any insoluble residue.

7. A process for recycling a waste multi-compartment detergent pouch containing more than one detergent or detergent auxiliary compositions enclosed within a water-soluble enveloping material wherein a first compartment contains a solid composition and a second compartment contains a liquid composition and wherein the first compartment has a dissolution time lower than the second, the process comprising:
   i) introducing a waste pouch into a mixing chamber;

ii) adding a solubilizing agent thereto in an amount sufficient to partially dissolve the enveloping material of the first compartment and subjecting the mixture to mechanical mixing to form a slurry wherein the residence time of pouch in the mixing chamber is greater than the dissolution time of the first compartment and smaller than that of the second compartment;

iii) separating the undissolved pouch residue; and iv) converting the resulting slurry to a solid form.

8. A process for making a multi-compartment detergent pouch wherein one or more compartments thereof contains a detergent or detergent auxiliary composition enclosed within a water-soluble enveloping material, said process comprising the steps of:

i) forming one or more open compartments;

ii) filling at least one open compartment with a detergent or detergent auxiliary composition comprising recycled material made by a process according to claim 1; and iii) closing and sealing the open compartments to produce a multi-compartment pouch.

9. A process according to claim 8 comprising the further step of adding a perfume to the recycled material before its addition to the open compartment.

10. A multi-compartment pouch obtainable according to the processes of claim 8.

11. A multi-compartment pouch obtainable according to the process of claim 9.

* * * * *